US008533681B2

(12) United States Patent
Zhou et al.

(10) Patent No.: US 8,533,681 B2
(45) Date of Patent: Sep. 10, 2013

(54) ATOMICITY VIOLATION DETECTION USING ACCESS INTERLEAVING INVARIANTS

(75) Inventors: Yuanyuan Zhou, Champaign, IL (US); Shan Lu, Urbana, IL (US); Joseph Andrew Tucek, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1575 days.

(21) Appl. No.: 11/857,925

(22) Filed: Sep. 19, 2007

(65) Prior Publication Data

US 2009/0077540 A1 Mar. 19, 2009

Related U.S. Application Data

(60) Provisional application No. 60/893,566, filed on Mar. 7, 2007.

(51) Int. Cl.
*G06F 9/44* (2006.01)

(52) U.S. Cl.
USPC ............................................................ 717/126

(58) Field of Classification Search
USPC ................................... 717/126–128, 131
See application file for complete search history.

(56) References Cited

U.S. PATENT DOCUMENTS 5,303,362 A * 4/1994 Butts et al. .................... 711/121

OTHER PUBLICATIONS

Wang, L. and Stoller, S., Runtime Analysis of Atomicity for Multithreaded Programs, http://www.cs.sunysb.edu/~stoller/papers/runtime-atomicity-TSE-2006.pdf, Feb. 15, 2006.*
Vega, A., et al., A Technique for Collecting Simultaneous Multithreaded Traces, http://web.fi.uba.ar/~ajvega/docs/vega06_tracegrind.pdf, Sep. 19, 2006.*
Lu, S., et al., AVIO: Detecting Atomicity Violations via Access Interleaving Invariants, CiteSeerX, 2006.*
Savage, Stefan et al., "Eraser: A Dynamic Data Race Detector for Multithreaded Programs", *ACM Transactions on Computer Systems*, V. 15, n. 4, (Nov. 1997),pp. 391-411.
Choi, Jong-Deok et al., "Efficient and Precise Datarace Detection for Multithreaded Object-Oriented Programs", *Proc. of the ACM SIGPLAN Conference on Programming Language Design and Implementation*, (Jun. 17-19, 2002),pp. 258-269.
"Intel Thread Checker 3.0 for Windows", Retrieved from <http://www.intel.com/cd/software/products/asmo-na/eng/286406.htm> on Feb. 23, 2007, 4 pages.
Sreedhar, Vugranam C., et al., "Identifying Loops Using DJ Graphs", *ACM Transactions on Programming Languages and Systems (TOPLAS)*, (Nov. 1996),pp. 649-658.
Ananian, C. S., et al., "Unbounded transactional memory", *In HPCA*, MIT Computer Science and Artificial Intelligence Laboratory,(2005),12 pages.

(Continued)

*Primary Examiner* — Anna Deng

(57) ABSTRACT

During execution of a program, the situation where the atomicity of a pair of instructions that are to be executed atomically is violated is identified, and a bug is detected as occurring in the program at the pair of instructions. The pairs of instructions that are to be executed atomically can be identified in different manners, such as by executing a program multiple times and using the results of those executions to automatically identify the pairs of instructions.

16 Claims, 8 Drawing Sheets

(56) References Cited

OTHER PUBLICATIONS

Barroso, L. A., et al., "Piranha: a scalable architecture based on single-chip multiprocessing", *Proceedings of the 27th Annual International Symposium on Computer Architecture*, (Jun. 2000),pp. 1-12.
Boyapati, C. et al., "Ownership types for safe programming: Preventing data races and deadlocks", *ACM Conference on Object-Oriented Programming, Systems, Languages and Applications (OOPSLA)*, (Nov. 2002),pp. 211-230.
Burrows, M. et al., "Finding stale-value errors in concurrent programs", *Compaq SRC Technical Note*, (Apr. 2002),pp. 1-15.
Chandra, S. et al., "How fail-stop are faulty programs?", *28th International Symposium on Fault-Tolerant Computing*, (Jun. 1998),10 pages.
Dinning, A. et al., "An empirical comparison of monitoring algorithms for access anomaly detection", *In PPoPP*, ACM 089791-350-7/90/0003/0001,(1990),pp. 1-10.
Engler, D. et al., "RacerX: Effective, static detection of race conditions and deadlocks", *In SOSP'03*, ACM1-58113-757-5/03/0010,(Oct. 19-22, 2003),16 pages.
Ernst, M. et al., "Quickly detecting relevant program invariants", *In ICSE*, (2000),10 pages.
Flanagan, C. et al., "Type-based race detection for java (summary)", *In PLDI*, (2000),pp. 1-2.
Flanagan, C. et al., "Atomizer: a dynamic atomicity checker for multithreaded programs", *In POPL*, (Jan. 14-16, 2004),12 pages.
Flanagan, C. et al., "A type and effect system for atomicity", *In PLDI*, (Jun. 9-11, 2003),12 pages.
Hammond, L. et al., "Transactional memory coherence and consistency", *In ISCA*, (2004),12 pages.
Hangal, S. et al., "Tracking down software bugs using automatic anomaly detection", *In ISCE*, (2002),11 pages.
Hardavellas, N. et al., "SimFlex: a fast, accurate, flexible full-system simulation framework for performance evaluation of server architecture", *SIGMETRICS Perform. Eval. Rev.*, vol. 31, n. 4, (2004),5 pages.
Harris, T et al., "Language support for lightweight transactions", *In OOPSLA'03*, (Oct. 26-30, 2003),pp. 388-402.
Henzinger, T. A., et al., "Race checking by context inference",*In PLDI*, (Jun. 9-11, 2004),13 pages.
Herlihy, M. et al., "Transactional memory: architectural support for lock-free data structures", *In ISCA*, (1993),12 pages.
Lamport, Leslie "Time, clocks, and the ordering of events in a distributed system", *Communications of the ACM*, vol. 21, n. 7, (Jul. 1978),pp. 558-565.
Liblit, B et al., "Bug isolation via remote program sampling", *In PLDI*, (Jun. 9-11, 2003),14 pages.
Luk, C. K., et al., "Pin: building customized program analysis tools with dynamic instrumentation", *In PLDI*, (Jun. 12-15, 2005),pp. 190-200.
Magnusson, P. S., et al., "Simics/sun4m: A virtual workstation", *Usenix Annual Technical Conference (originally published in the Proceedings of the USENIX Annual Technical Conference (No. 98))*, (1998),13 pages.
Min, S. L., et al., "An efficient cache-based access anomaly detection scheme", *In Proceedings of ASPLOS IV*, (Apr. 1991),pp. 235-244.
Narayanasamy, S. et al., "Bugnet: Continuously recording program execution for deterministic replay debugging", *In Proceedings of the International Symposium on Computer Architecture*, (Jun. 2005),pp. 1-12.
Nethercote, N. et al., "Valgrind: A program supervision framework", *ENTCS*, Available at <http://www.elsevier.nl/locate/entcs/volume89.html>,(2003),22 pages.
Netzer, R H., et al., "Improving the accuracy of data race detection", *Proc. of the Third ACM SIGPLAN Symposium on Principles and Practice of Parallel Programming*, (Apr. 1991),pp. 1-12.
O'Callahan, R. et al., "Hybrid dynamic data race detection", *In PPoPP*, (Jun. 11-13, 2003),pp. 167-178.
Perkovic, D. et al., "Online data-race detection via coherency guarantees", *In OSDI*, (1996),11 pages.
Pozniansky, E. et al., "Efficient on-the-fly data race detection in multithreaded c++ programs", *In PPoPP*, (2003),Abstract + pp. 1-48.
Prvulovic, M. et al., "Cord:cost-effective (and nearly overhead-free) orderreordering and data race detection", *Proceedings of the 12th International Symposium on High-Performance Computer Architecture (HPCA-12)*, (Feb. 2006),12 pages.
Prvulovic, M. et al., "ReEnact: Using thread-level speculation mechanisms to debug data races in multithreaded codes", *Proceedings of the 30th Annual International Symposium on Computer Architecture (ISCA-30)*, (Jun. 2003), 12 pages.
Richards, B. et al., "Protocol-based data-race detection", *Proceedings of the 2nd SIGMETRICS Symposium on Parallel and Distributed Tools*, (Aug. 1998),pp. 1-8.
Sasturkar, A. et al., "Automated type-based analysis of data races and atomicity", *In PPoPP*, (Jun. 15-17, 2005),12 pages.
Poulsen, Kevin "Software Bug Contributed to Blackout", *SecurityFocus News*, Retrieved from <http://www.securityfocus.com/news/8016> on Feb. 18, 2004,2 pages.
Tuck, N. et al., "Hardware and binary modification support for code pointer protection from buffer oveflow", *Proceedings of the 37th International Symposium on Microarchitecture (MICRO-37 2004)*, (2004),12 pages.
Vaziri, M. et al., "Associating synchronization constraints with data in an object-oriented language", *In POPL*, (Jan. 11-13, 2006),12 pages.
Von Praun, C. et al., "Object race detection", *In OOPSLA*, (2001),13 pages.
Wang, L. et al., "Static analysis for programs with nonblocking synchronization", *In PPoPP*, (Jun. 15-17, 2005),11 pages.
Woo, S. C., et al., "The SPLASH-2 programs: Characterization and methodological considerations", *Proceedings of the 22nd Annual International Symposium on Computer Architecture*, (Jun. 1995),pp. 24-36.
Xu, M. et al., "A "flight data recorder" for enabling full-system multiprocessor deterministic replay", *In ISCA*, (2003),12 pages.
Xu, M. et al., "A serializability violation detector for shared-memory server programs", *In PLDI*, (Jun. 12-15, 2005),14 pages.
Yu, Y. et al., "Racetrack: Efficient detection of data race conditions via adaptive tracking", *In SOSP*, (Oct. 23-26, 2005),14 pages.
Zhou, P. et al., "AccMon: Automatically Detecting Memory-Related Bugs via Program Counter-based Invariants", *Proceedings of the 37th International Symposium on Microarchitecture (MICRO-37 2004)*, (2004),12 pages.
Zhou, P. et al.,"iWatcher: Efficient Architecture Support for Software Debugging", *In ISCA*, (2004),12 pages.

\* cited by examiner

ATOMICITY VIOLATION DETECTION USING ACCESS INTERLEAVING INVARIANTS

This application claims the benefit under 35 U.S.C. §119 (e) of U.S. Provisional Application No. 60/893,566, filed Mar. 7, 2007.

STATEMENT REGARDING FEDERALLY SPONSORED RESEARCH OR DEVELOPMENT

This invention was made with Government support under Contract Number CCR-0325603 and Contract Number CNS-0347854, both awarded by the National Science Foundation (NSF), and Contract Number DE-FG02-05ER25688 awarded by the Department of Energy (DOE). The Government has certain rights in the invention.

BACKGROUND

Computer programs, when initially written, oftentimes have errors in them which are commonly referred to as bugs. The programs are typically tested to identify these bugs so that they can be fixed and the program will run as intended by the programmer. As computers have become more powerful, computer programs have become larger and more complex, making it increasingly difficult to detect bugs in the programs.

One particular type of bug is referred to as an atomicity violation. An atomicity violation refers to the situation where the programmer intended two instructions to be executed serially without any other instructions interfering with the memory location(s) accessed by those two instructions, but where another instruction can interfere with a memory location(s) accessed by those two instructions. Atomicity violations can be difficult for the programmer to detect, particularly in environments where programs are executed as multiple threads because it is difficult for the programmer to foresee when an instruction from another thread will interfere with the two instructions he or she intended to be executed serially without interference. Accordingly, it would be beneficial to have an improved way to detect such atomicity violations.

SUMMARY

Atomicity violation detection using access interleaving invariants is discussed herein.

In accordance with one or more embodiments, a method of detecting atomicity violations in a program includes executing the program multiple times and identifying, based on the multiple executions of the program, multiple pairs of instructions that were intended to be executed atomically. Additionally, during execution of the program, the situation is identified where a pair of instructions is to be executed and the atomicity of the pair of instructions violated, and a bug is detected as occurring in the program at the pair of instructions.

In accordance with one or more other embodiments, atomicity violations in a program are detected by checking whether a first instruction of a pair of instructions in the program is a read access instruction type or a write access instruction type. If the first instruction is the read access instruction type, then an atomicity violation is detected at the pair of instructions based on whether there are any interleaving remote write accesses to a same location as accessed by the pair of instructions between the first instruction and a previous instruction of the pair of instructions. If the first instruction is the write access instruction type, then an atomicity violation is detected at the pair of instructions based on whether the previous instruction of the pair of instructions is the read access instruction type or the write access instruction type.

In accordance with one or more other embodiments, access interleaving invariants in a program are automatically extracted by identifying, from multiple executions of the program, a set of access interleaving invariants that are not violated during the multiple correct executions of the program. The identified access interleaving invariants are used as a set of automatically extracted access interleaving invariants for the program.

In accordance with one or more other embodiments, a computing device includes a processor and a cache memory storing data organized by cache line. Each cache line has associated with it a downgrade bit and a preceding access instruction bit. The downgrade bit is set when data in the cache line is a result of a previous write access by a local thread and the cache line has been read by a remote thread, and the downgrade bit is cleared when the local thread accesses the cache line. The preceding access instruction bit is set when the local thread performs a read access to the cache line, and the preceding access instruction bit is cleared when the local thread performs a write access to the memory location.

BRIEF DESCRIPTION OF THE DRAWINGS

The same numbers are used throughout the drawings to reference like features.

DETAILED DESCRIPTION

Atomicity violation detection using access interleaving invariants is discussed herein. An access interleaving invariant (AI invariant) refers to a pair of instructions that the programmer intended to be executed atomically. AI invariants are automatically extracted from program code based on multiple executions of the program code. These extracted AI invariants are then used during subsequent execution of the program code to automatically detect AI invariant violations, which are atomicity violations in the code.

Figure 1:
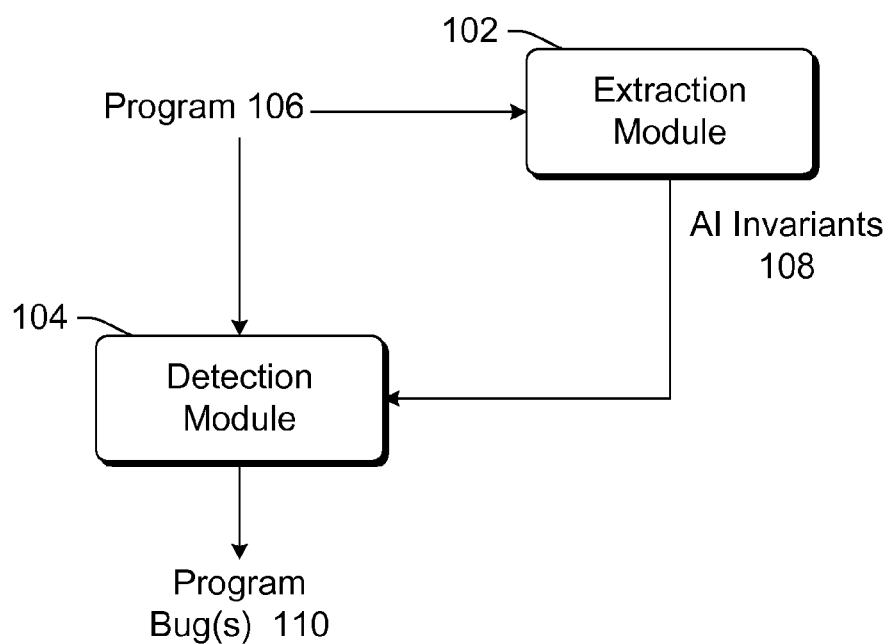
FIG. 1 is a block diagram illustrating an example system implementing the atomicity violation detection using access interleaving invariants in accordance with one or more embodiments.

FIG. 1 is a block diagram illustrating an example system 100 implementing the atomicity violation detection using access interleaving invariants in accordance with one or more embodiments. System 100 can be implemented in software, firmware, hardware, or combinations thereof. For example, system 100 can be implemented as software modules executing on one or more computing devices.

System 100 includes an extraction module 102 and a detection module 104. Extraction module 102 obtains a program 106, which is code written as multiple instructions, and analyzes the code to automatically extract AI invariants 108 from program 106. AI invariants 108 are pairs of instructions that module 102 detects as instructions that the programmer intended to be executed atomically.

Detection module 104 obtains both AI invariants 108 and program 106. Detection module 104 analyzes the code of program 106 and automatically detects AI invariant violations, which are atomicity violations in program 106 and which module 104 identifies as potential program bug(s) 110. These potential bugs can then be analyzed by a programmer to determine whether they are in fact errors in program 106.

Modules 102 and 104 can be implemented on the same device, or alternatively different devices. For example, extraction module 102 may be implemented on one computing device while detection module 104 is implemented on one or more other computing devices. Detection module 104 can be executed during a testing phase for program 106 (e.g., before the program is released to customers), and/or during normal operation of program 106. For example, detection module 104 may execute while program 106 is executing on end users' machines, and can notify the programmer of program bug(s) 110 so that the errors can be subsequently corrected by the programmer.

Many systems execute programs, such as program 106, using a multithreading architecture. In a typical multithreading architecture, the operating system of a computing device executes program 106 as multiple different threads, and these different threads can be executed in parallel. This parallel execution can be accomplished by time slicing in a single-processor or single-core computing device, or by using different processors (or cores) in a multi-processor (or multi-core) computing device. The manner in which the multithreading architecture is implemented can vary by operating system type and computing device type, and is well-known to those skilled in the art.

For ease of explanation, certain terminology is used herein. Atomicity of instructions refers to instructions that, when executed, create a data manipulation effect that is equivalent to the instructions being executed serially. In a multithreading architecture, a first thread can be interrupted by or interleaved with a second thread by having the instructions from the two threads performed in parallel. For example, the first thread may include a series of read instructions, and a series of write instructions in the second thread may be performed in parallel. This series of write instructions can interrupt or be interleaved with the series of read requests.

As an example of atomicity, assume that a thread of a program is performing seat selection for customers on an airplane. The thread may read a value from a memory location that represents whether that seat is occupied, determine that that seat is not occupied, and write a value to the memory location indicating that that seat is assigned to a first customer. These read and write operations should be atomic. If they were not atomic, then a second thread may read the value from the memory location (after the first thread has read the value but before the first thread has written any value back to that memory location), determine that the seat is not occupied, and write a value to the memory location indicating that the seat is assigned to a second customer. This is clearly problematic because two different customers are assigned to the same seat. There is no atomicity of these instructions because if the read and write instructions in the first thread were performed serially, then the seat would only be assigned to the first customer, so the instructions do not create a data manipulation effect that is equivalent to the instructions being executed serially.

A thread whose instructions are interrupted is referred to as the local thread and its accesses to memory are referred to as local accesses or local reads/writes. It should be noted that "local" here refers to the thread, and does not infer any property on variable types (e.g., it does not require access to a local variable). The thread with the interleaving or interrupting access is referred to as the remote thread, and its accesses are referred to as remote accesses or remote reads/writes.

A serializable interleaving refers to an interleaving between local and remote accesses that is equivalent to a serial non-interleaving execution of instructions. An unserializable interleaving refers to an interleaving between local and remote accesses that is not equivalent to a serial non-interleaving execution of instructions.

An AI invariant refers to an invariant that is held by an instruction if the access pair, made up of the instruction itself and its preceding local access to the same location, is never unserializably interleaved. The instruction itself is referred to herein as an I-instruction (the invariant instruction), and the preceding access instruction is referred to as a P-instruction (the previous instruction). The AI invariant can thus be viewed as referring to or including both the I-instruction and the P-instruction. Both the I-instruction and the P-instruction are accesses to the same location, and there may be zero or more instructions between the I-instruction and the P-instruction. If the AI invariant is unserializably interleaved, then the instructions where that AI invariant is unserializably interleaved is referred to as an AI invariant violation.

The use of multiple threads in executing program 106 can result in situations where accesses to the same shared variable (the same memory location) are interleaved. Eight different cases can occur, as described below in Table I. In each case described in Table I, the read and/or write accesses are to the same shared variable or memory location. The subscript r denotes interleaving access by a remote thread, the superscript i denotes one access (the I-instruction) and the superscript p denotes its preceding access from the same thread (the P-instruction).

TABLE I

| Interleaving | Case # | Description | Serializability | Equivalent Serial Accesses |
|---|---|---|---|---|
| $read^p$ $read_r$ $read^i$ | 0 | Two reads interleaved by a read | Serializable | $read^p$ $read^i$ $read_r$ |

TABLE I-continued

| Interleaving | Case # | Description | Serializability | Equivalent Serial Accesses |
|---|---|---|---|---|
| $write^p$ $read_r$ $read^i$ | 1 | Read after write interleaved by a read | Serializable | $write^p$ $read^i$ $read_r$ |
| $read^p$ $write_r$ $read^i$ | 2 | Two reads interleaved by a write | Unserializable | N/A |
| $write^p$ $write_r$ $read^i$ | 3 | Read after write interleaved by a write | Unserializable | N/A |
| $read^p$ $read_r$ $write^i$ | 4 | Write after read interleaved by a read | Serializable | $read_r$ $read^p$ $write^i$ |
| $write^p$ $read_r$ $write^i$ | 5 | Two writes interleaved by a read | Unserializable | N/A |
| $read^p$ $write_r$ $write^i$ | 6 | Write after read interleaved by a write | Unserializable | N/A |
| $write^p$ $write_r$ $write^i$ | 7 | Two writes interleaved by a write | Serializable | $write_r$ $write^p$ $write^i$ |

As can be seen from Table I, four of the eight possible interleaving cases are serializable interleavings. Serializable interleavings do not lead to atomicity violations. However, unserializable interleavings can lead to atomicity violations if they violate the programmer's assumption of atomicity. Thus, during operation, extraction module 102 and detection module 104 focus on identifying unserializable interleavings, as these can lead to AI invariant violations.

The unserializable interleavings are case numbers 2, 3, 5, and 6. In case 2, two local read accesses are interleaved by one or more remote write accesses. One or more additional remote read and/or write accesses may also occur between the two local accesses. In case 2, it is possible for the two different read accesses to read two different values (depending on what value(s) the one or more remote write accesses wrote). For example, assume the first local read access ($read^p$) reads a value of "5" and the remote write access ($write_r$) writes a value of "7". In this example, the second local read access ($read^i$) would read a value of "7", even though the programmer may have intended that both local read accesses read the same value.

In case 3, a local read access after a local write access is interleaved by one or more remote write accesses. One or more additional remote read and/or write accesses may also occur between the two local accesses. In case 3, it is possible for the local read access to fail to get the local result that it expects (depending on what value(s) the one or more remote write accesses wrote). For example, assume the local write access ($write^p$) writes a value of "3" and the remote write access ($write_r$) writes a value of "10". In this example, the local read access ($read^i$) would read a value of "10", even though the programmer may have intended that the value "3" be read.

In case 5, a local write access after a local write access is interleaved by a remote access sequence that starts with a read access. One or more additional read and/or write accesses may also occur after the remote read access but before the second local write access. In case 5, it is possible for the local intermediate result between the two local write accesses to be visible to a remote thread, a value which the programmer may not have intended to be made visible. For example, assume the first local write access ($write^p$) writes a value of "12" and the second local write access ($write^i$) writes a value of "15". In this example, the remote read access ($read_r$) would read a value of "12", even though the programmer may have intended that the value "15" be read.

In case 6, a local write access after a local read access is interleaved by one or more remote write accesses. One or more additional remote read and/or write accesses may also occur between the two local accesses. In case 6, it is possible for the result of the local read access to be stale due to the value written by the remote write access. For example, assume the local read access ($read^p$) reads a value of "8" and the remote write access ($write_r$) writes a value of "9". In this example, the programmer may have intended to have the up-to-date value, in this case "9", used by other instructions prior to executing the local write access ($write^i$), but the stale value "8" may instead be used.

The interleavings discussed herein are discussed primarily with reference to two threads: a local thread and a remote thread. However, it should be noted that the interleavings may alternatively involve two or more remote threads. The techniques discussed herein automatically identifies the AI invariants regardless of whether there is a single remote thread or multiple remote threads in the interleavings.

It should also be noted that not all unserializable interleavings result in atomicity violations. Situations can occur in programming where an unserializable interleaving is allowed, and such situations are not atomicity violations. Extraction module 102 attempts to filter out allowed unserializable interleavings so that they are not identified as AI invariants and do not lead to identification of such interleavings as program bugs.

During operation, extraction module 102 automatically identifies those unserializable interleavings that are most likely AI invariants, and outputs those AI invariants as AI invariants 108. Extraction module 102 can automatically learn the programmer's intention in various different manners, such as by studying the program's behavior during execution. In one or more embodiments, module 102 collects and analyzes access interleavings from a set of correct runs to identify which shared accesses allow unserializable interleavings, and which shared accesses do not have unserializable interleavings. The shared accesses which do not have unserializable interleavings are the AI invariants. Essentially, module 102 is trained through multiple training runs or executions of the program to learn the program's AI invariants. Given these AI invariants, detection module 104 automatically identifies an unserializable interleaving between an I-instruction and its preceding local access instruction (P-instruction) to the same shared variable as an AI invariant violation.

In the discussions herein, the AI invariants are discussed as referencing a common memory location or shared variable. In alternate embodiments, instructions of the AI invariants may include references to multiple memory locations or multiple shared variables. In such embodiments, a group of instructions referring to multiple memory locations or shared variables can be treated as multiple groups of instructions with each group referring to only one of those multiple memory locations or shared variables.

Figure 2:
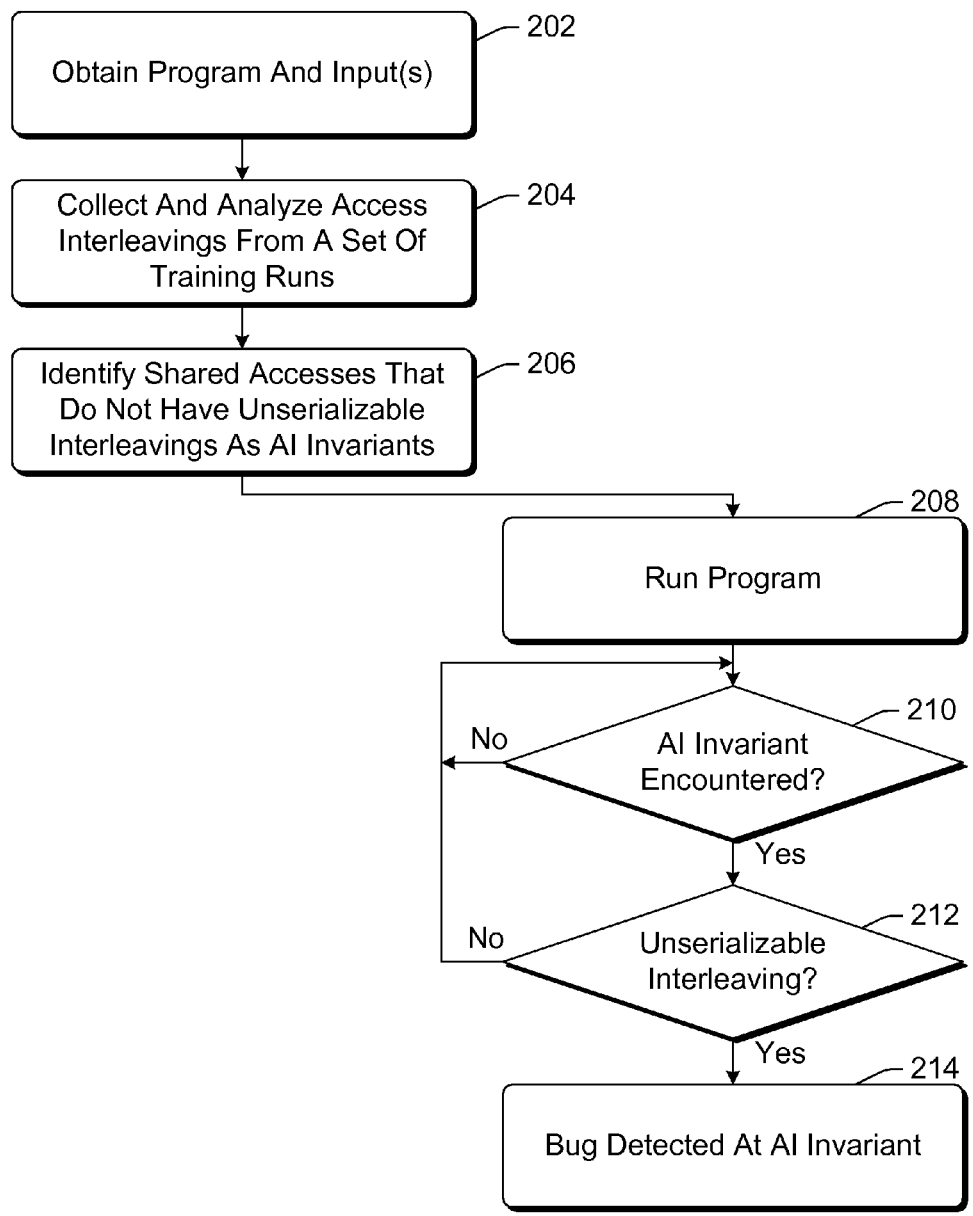
FIG. 2 is a flowchart illustrating an example process for atomicity violation detection using access interleaving invariants in accordance with one or more embodiments.

FIG. 2 is a flowchart illustrating an example process 200 for atomicity violation detection using access interleaving invariants in accordance with one or more embodiments. Process 200 is performed, for example, by system 100 of FIG. 1. Process 200 can be performed in software, firmware, hardware, and/or combinations thereof.

For ease of explanation, the extraction portion of process 200 is illustrated on the left-hand side of FIG. 2 (as acts 202-206), and the detection portion of process 200 is illustrated on the right-hand side of FIG. 2 (as acts 208-214). Acts 202-206 can be performed, for example, by extraction module 102 of FIG. 1. Acts 208-214 can be performed, for example, by detection module 104 of FIG. 1.

Initially, the program to be tested is obtained, along with any input(s) to the program (act 202). Process 200 executes the program multiple times with the same input(s), although alternatively the input(s) may change for different executions of the program. The access interleavings from a set of training runs are then collected and analyzed (act 204). From these collected access interleavings, those shared accesses that allow unserializable interleavings are identified, and those shared accesses that do not have unserializable interleavings are identified. The shared accesses that do not have unserializable interleavings are identified as AI invariants (act 206).

It should be noted that not all unserializable interleavings in a program are necessarily atomicity violations. In certain situations, the use of unserializable interleavings is permitted, and may even be intended by the programmer. In acts 204 and 206, those situations where the unserializable interleavings are permitted and those where no unserializable interleavings are intended are automatically detected. Only those situations where no unserializable interleavings are intended are identified as AI invariants in act 206.

Given the AI invariants from act 206, the program is then run (act 208). For each instruction executed, a check is made as to whether an AI invariant (as identified in act 206) is encountered (act 210). An AI invariant is encountered when the instruction being executed (or to be executed) is an I-instruction of the AI invariant (as identified in act 206). Alternatively, the AI invariant could be encountered when the instruction begin executed (or to be executed) is a P-instruction of the AI invariant.

If an AI invariant is not encountered, then act 210 is repeated for the next instruction. However, if an AI invariant is encountered, then a check is made as to whether an unserializable interleaving is occurring (act 212). This check can be performed, for example, by analyzing the instructions being executed and determining whether those instructions are unserializable (e.g., as discussed with reference to Table I above).

If an unserializable interleaving is not occurring, then process 200 returns to act 210 to check whether an AI invariant is encountered for the next instruction. However, if an unserializable interleaving is occurring, then a bug is detected at that AI invariant (act 214). An identification of this bug can be output, for example, as a program bug 110 of FIG. 1.

It should be noted that one reason atomicity violations can be difficult to detect is the nature of interleaving accesses resulting from multithreading. Different executions of the same program with the same inputs can result in the same instructions being executed in different orders for different executions because of the multithreading. In order for the atomicity violation to create an erroneous result, the interleaving access(es) must occur in a particular order. Therefore, it is possible for a program to be executed numerous times and generate a correct output, even though there is an atomicity violation bug in the program code. Process 200 is designed to account for this property of atomicity violations by analyzing access interleavings of multiple training runs, as discussed above.

It should also be noted that the extraction of AI invariants and detection of bugs as discussed herein is performed automatically. The programmer does not need to annotate, comment, or otherwise identify those portions of the code that he or she desires to be atomic portions. Rather, those portions are automatically identified using the techniques discussed herein.

Figure 3:
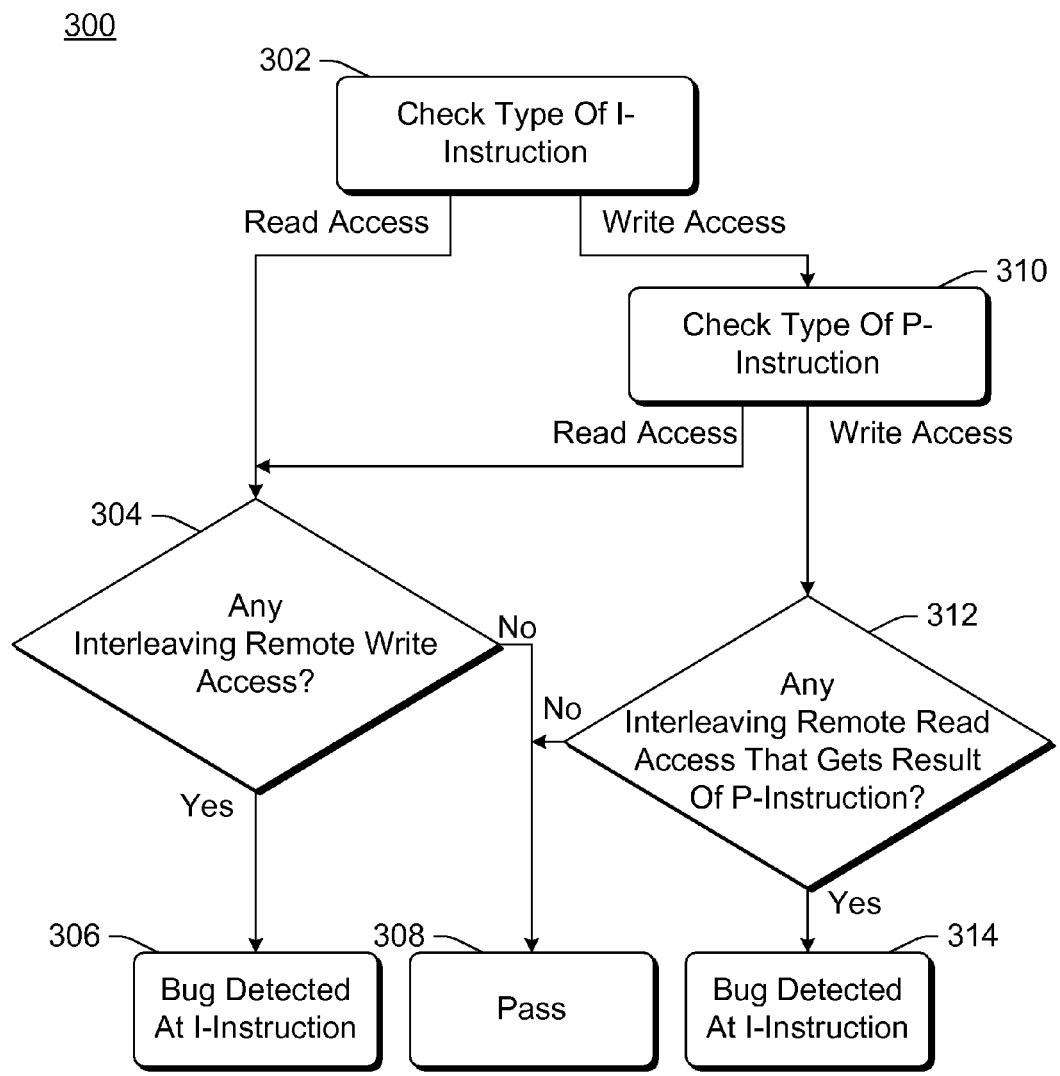
FIG. 3 is a flowchart illustrating an example process for detecting a bug at an access interleaving invariant in accordance with one or more embodiments.

FIG. 3 is a flowchart illustrating an example process 300 for detecting a bug at an AI invariant in accordance with one or more embodiments. Process 300 is performed, for example, by system 100 of FIG. 1. Process 300 can be performed in software, firmware, hardware, and/or combinations thereof. In one or more embodiments, process 300 implements acts 210-214 of FIG. 2.

Process 300 is performed for each I-instruction encountered during execution of the program. Initially, a check is made to determine the type of the I-instruction (act 302). The type of the I-instruction can be either a read access or a write access. If the I-instruction type is a read access, then a check is made to determine whether there are any interleaving remote write accesses between the I-instruction and the P-instruction (act 304). If there is one or more interleaving remote write accesses, then a bug is detected at that I-instruction (act 306). However, if there are no interleaving remote write accesses, then the I-instruction passes the detection test (act 308).

Returning to act 302, if the I-instruction type is a write access, than a check is made to determine the type of the P-instruction (act 310). The type of the P-instruction can be either a read access or a write access. If the P-instruction type is a read access, then a check is made to determine whether there are any interleaving remote write accesses between the I-instruction and the P-instruction (act 304). If there is one or more interleaving remote write accesses, then a bug is detected at that I-instruction (act 306). However, if there are no interleaving remote write accesses, then the I-instruction passes the detection test (act 308).

Returning to act 310, if the P-instruction type is a write access, then a check is made as to whether there is at least one interleaving remote read access that gets the result of the P-instruction (act 312). If there is at least one such interleaving remote read access, then a bug is detected at that I-instruction (act 314). However, if there are no such interleaving remote read accesses, then the I-instruction passes the detection test (act 308).

Figure 4:
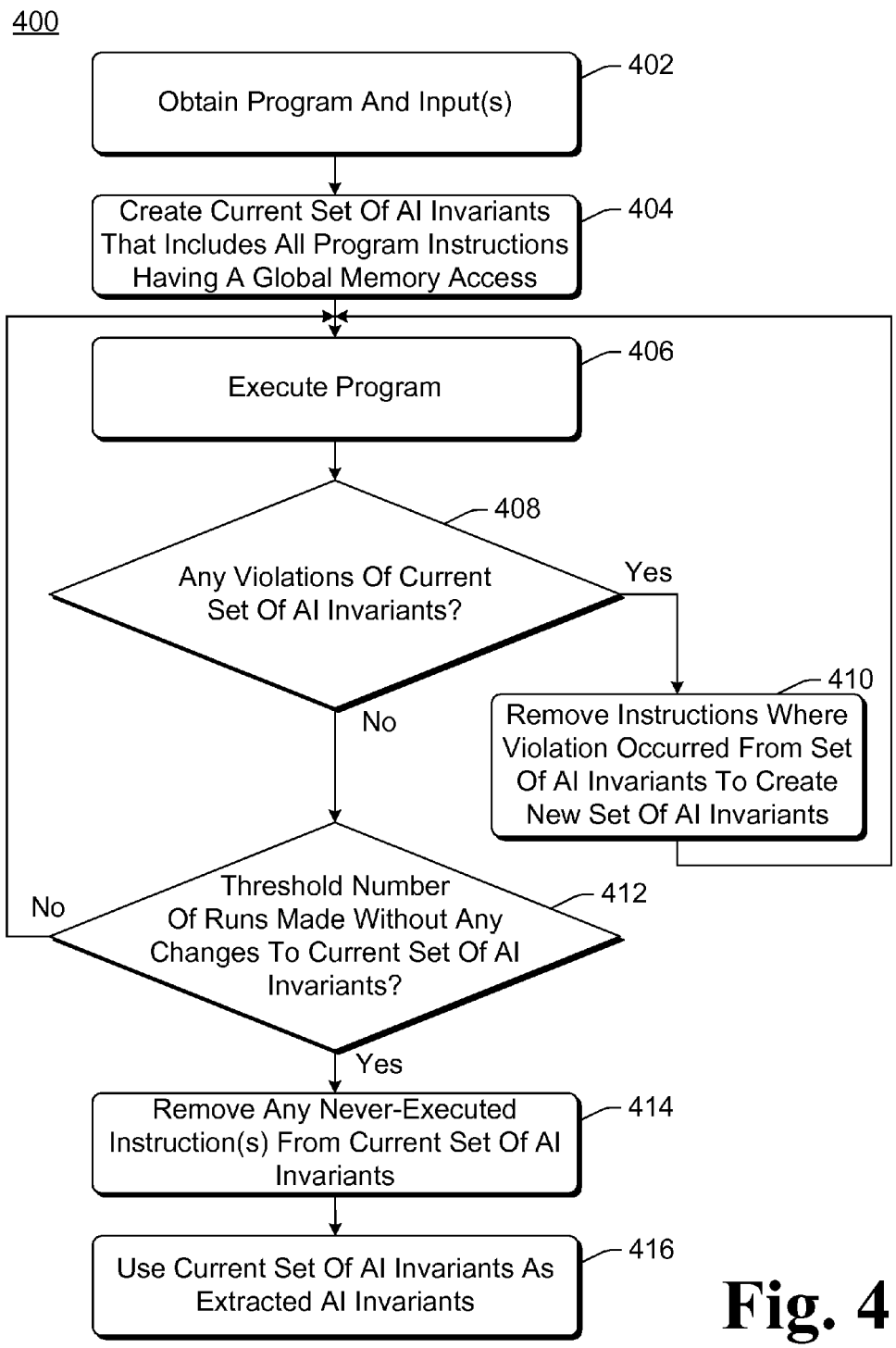
FIG. 4 is a flowchart illustrating an example process for extracting access interleaving invariants in accordance with one or more embodiments.

FIG. 4 is a flowchart illustrating an example process 400 for extracting AI invariants in accordance with one or more embodiments. Process 400 is performed, for example, by system 100 of FIG. 1. Process 400 can be performed in software, firmware, hardware, and/or combinations thereof. In one or more embodiments, process 400 implements acts 202-206 of FIG. 2.

Generally, process 400 performs multiple executions of the program and identifies unserializable interleavings during the execution. Initially, a set of all shared memory accessing instructions for the program is created. Each execution of the program is identified by the programmer or other individual (or alternatively another program) as being a correct execution or an incorrect execution. For each correct execution, the instructions where unserializable interleavings are detected during that execution are deemed to not be AI invariants, and are removed from the set. The program is executed multiple times until no unserializable interleavings to the instructions in the set are detected for at least a threshold number of executions. Any instructions in the set that were never executed during any of the executions of the program are also removed from the set, and the remaining instructions in the set are the extracted AI invariants for the program.

Initially, the program to be tested is obtained, along with any input(s) to the program (act 402). Process 400 executes the program multiple times with the same input(s), although alternatively the input(s) may change for different executions of the program. A current set of AI invariants that includes all program instructions having a global memory access is created (act 404). Each AI invariant in the current set of AI invariants refers to a pair of instructions, including an I-instruction and a P-instruction. This initially created set serves as a set of possible AI invariants in the program, and instructions will be removed from this set during repeated execution of the program, as discussed below.

The program is then executed (act 406), and a check is made as to whether there were any violations of the current set of AI invariants during execution of the program (act 408). Violations of the current set of AI invariants can be identified, for example, using process 300 of FIG. 3, where a violation of an AI invariant including an I-instruction is identified at every I-instruction where a bug is detected. If there were any violations of the current set of AI invariants, then the instructions (the I-instructions and the P-instructions) where those violations occurred are removed from the current set of AI invariants, creating a new current set of AI invariants (act 410). Process 400 then returns to act 406, where the program is executed again.

In act 410, any AI invariant that is violated once is removed from the current set of AI invariants. Alternatively, an AI invariant may be removed only if it is violated multiple times, such as at least a threshold number of times (regardless of the number of executions of program 406), in at least a threshold percentage of executions of program 406, and so forth.

Returning to act 408, if there were no violations of the current set of AI invariants during execution of the program, then a check is made as to whether a threshold number of executions of the program were made without any changes to the current set of AI invariants (act 412). Typical values for this threshold number range from 3 to 10, although larger or smaller threshold numbers could alternatively be used. If the threshold number of executions of the program have not been made, then process 400 returns to act 406 where the program is executed again.

However, if the threshold number of executions of the program have been made, then any AI invariants in the current set of AI invariants that include instructions that were never executed (in any of the executions of the program in act 406), whether they are P-instructions or I-instructions, are removed from the current set of AI invariants (act 414). The remaining AI invariants in the current set of AI invariants are then used as the extracted AI invariants (act 416).

FIG. 4 illustrates an example process for extracting AI invariants. However, in alternate embodiments AI invariants can be extracted in different manners. The process of detecting AI invariant violations (e.g., as performed by detection module 104 of FIG. 1) is based on AI invariants having been extracted, although the detection process need not be concerned with how those AI invariants are extracted.

In the extraction process discussed, above, the AI invariants are extracted by starting with a large set of instructions and removing unqualified instructions from the set. Alternatively, other techniques can be employed in which the extraction process begins with an empty set and adds qualified instructions to it. Examples of such alternative techniques are discussed below.

In one or more alternate embodiments, AI invariants are extracted by analyzing a trace of the program. The program is run with instrumentation that records a total order of all memory accesses and their respective program counters (PCs), target addresses, and thread identifiers (IDs). So, for each memory access, a tuple <order, PC_value, memory_address, thread_ID> is generated. The "order" in this tuple gives a total ordering of all memory accesses as they in-fact happened. The order can be generated in different manners, such as by wrapping each memory access by the instrumentation (marked with "+" signs) as follows:

+ lock global counter lock
+ increment counter & use counter value as order record
  <order, PC value, memory address, thread ID> access memory
+ unlock global counter lock Alternatively, for finer locking granularity, the lock can be specific to each memory location, and the counter can be incremented with an atomic Get-and-Increment instruction.

These generated tuples can then be used to extract the AI invariants. Generally, for each PC, how often the instruction at that PC consumed remote data (written to or read by) is measured. If the PC consumed data less than a threshold number of times, that the PC (or the instruction at that PC) is identified as one of the extracted AI invariants. Table II illustrates example pseudocode that uses the generated tuples to extract the AI invariants. In the pseudocode of Table II, remarks or comments are shown starting with the "#" symbol.

TABLE II

ALL_PCs = set of all PC values touched
$record = table of <order, PC_value, memory_address, thread_ID>
counts[pc] = array of counters (init to 0) for each PC value
loop over the PCs for each $pc in ALL_PCs
 #loop over the accesses from that PC
 foreach $access in 'SELECT from $record WHERE PC_value = $pc'
  $prev_access = 'SELECT MAX(order) from $record WHERE memory_address =

TABLE II-continued

```
$access.memory_address AND order < $access.order'
    #that is, get the access to the same memory address which happened most recently
but previously to when $access happened
        if($prev_access == NULL) continue; #just skip this access then.
        if($prev_access.thread_ID != $access.thread_ID) #maybe this isn't an invariant
            increment counts[$pc]
    if( counts[$pc] < THRESHOLD ) #we didn't see much evidence it wasn't an invariant.
        add $pc to the invariants list
```

The pseudocode in Table II is an example, and various modifications can be made to the process. One such modification is to weight the increment to counts[$pc]. For example, if the preceding access by the same thread was close in time (e.g., based on the order in the tuple), then counts[$pc] may be incremented more to help reduce false positives. The amount counts[$pc] is incremented can also vary based on the type of the previous access (e.g., larger increments if the previous access was a remote write).

Another modification is that the THRESHOLD check can be varied. For example, the check can be based on counts [$pc]/number of instances of $pc so as to weight frequently-run instructions. By way of another example, the THRESHOLD amount could be raised or lowered. The amount could be lowered for instructions involving a locked bus cycle (since programmers typically think about such instructions more since they must explicitly specify them; hence if they interleave any it is likely intentional, or at least well-thought-out). Or, the amount could be raised for stack-based accesses (e.g. move [sp+5] . . . ), since interleavings involving the stack are quite odd, and so a lot of them should be needed in order to consider them normal.

Alternatively, AI invariants can be extracted based on invariants being explicitly annotated by the programmer. Such annotations can be valuable because a programmer may believe that he or she has correctly programmed the two accesses to occur without interleaving, but may be incorrect. This explicit annotation technique can be used in combination with other techniques for extracting AI invariants, or alternatively can be used on its own.

Alternatively, AI invariants can be extracted based on static analysis. For example, a process can assume that all accesses other than the first in any basic block are AI invariants. A basic block refers to a set of instructions having one entry point and one exit point (and thus no jump instructions contained within it). Table III illustrates several example instructions, with comments shown starting with the "#" symbol. In the instructions of Table III, there are four basic blocks made up of instructions 01-02, 03-05, 06-09, and 10-11.

TABLE III

```
01: access x; #not invariant--first access
02: if(x){ #Invariant -- the previous access x is in the same basic block
03:    access y; #not invariant--first access to y in this block
04:    access x; #also not invariant -- the "if(x)" is a different basic block
05:    access y; #is invariant
06: }else{
07:    access x; #not invariant -- this is a separate basic block
08:    access y; # not invariant -- this is a separate basic block
09: }
10: access x; # not invariant -- this is a separate basic block
11: access x; #is invariant
```

By way of another example of static analysis, any straight-through runs of sets of instructions with no backward control flow edges (from recursive function calls, loops, or unstructured goto's) can be viewed as larger "blocks" and the same rule as above regarding basic blocks can be applied. Table IV illustrates several example instructions, with comments shown starting with the "#" symbol.

TABLE IV

```
01: access x; #not invariant
02: while(x){ # not invariant--we can backward jump here from
05, so this is the "top"
03:    access x; #invariant
04:    access x; #not invariant--we can backward jump here from 07
05: }
06: access x; #invariant--regardless of the dynamic flow, we will have
        #accessed x "above" without an intervening back-edge:
        # from 02 and failing the conditional.
07: goto 04;
```

Backward control flow edges (or simply backward edges or back-edges) can be readily identified from source code. From binary code, additional analysis is performed using the well-known Tarjan's algorithm and/or dominator analysis to identify the backward edges. Additional information regarding such detection of back-edges can be found in Vugranam C. Sreedhar, Guang R. Gao, Yong-Fong Lee, "Identifying Loops Using DJ Graphs", ACM Transactions on Programming Languages and Systems (TOPLAS), November 1996, pages 649-658.

As discussed above, the atomicity violation detection using access interleaving invariants can be performed in software, firmware, hardware, or combinations thereof. An example of a combination software (or firmware) and hardware implementation in accordance with one or more embodiments is illustrated with reference to FIGS. 5 and 6. The example illustrated in FIGS. 5 and 6 extends cache lines to store additional information to support the techniques discussed herein. An atomicity violation control logic (e.g., implemented as, or as part of, detection module 104 of FIG. 1), accesses information in the cache lines to determine whether an atomicity violation has occurred. The atomicity violation control logic is typically implemented in firmware and/or hardware.

Figure 5:
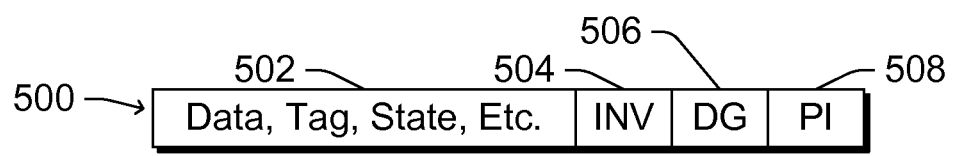
FIG. 5 illustrates an example cache line that can be used to support the atomicity violation detection using access interleaving invariants discussed herein.

FIG. 5 illustrates an example cache line 500 that can be used to support the atomicity violation detection using access interleaving invariants discussed herein. Data to be operated on by a processor in a computing device is transferred into cache memory of the computing device, and data is maintained in the cache memory (memories) organized as cache lines. A cache coherence protocol is implemented in the computing device to maintain the integrity of data in the system, which could be stored at any one time at any of one or more different levels of memory (including the system memory, multiple caches, and so forth). This cache coherence protocol is typically implemented in firmware and/or hardware.

Cache line 500 includes a data portion 502, an invalidate (INV) bit 504, a downgrade (DG) bit 506, and a preceding access instruction (PI) bit 508. Cache line 500 refers to a cache line in an L1 cache memory, although other cache memories typically maintain similar (or the same) cache lines.

Data portion 502 includes the data for cache line 500, as well as additional tag, state, and other well-known information describing the cache line. INV bit 504 is a single bit that typically exists in cache coherence hardware. INV bit 504 provides information about any interleaving remote write after the previous local memory access. In invalidation-based cache coherence protocols, interleaving remote writes will invalidate all other copies of the cache line, causing INV bit 504 to be set (e.g., to a value of "1"). INV bit 504 is cleared (e.g., to a value of "0"), when the cache line is again valid. The use of INV bit 504 can be leveraged for the atomicity violation detection using access interleaving invariants, as INV bit 504 allows the atomicity violation control logic to see whether a remote write has happened by checking INV bit 504.

DG bit 506 provides information to determine whether the previous local write's result has been read by a remote thread. In invalidation-based cache coherence protocols, when a previous local write's result has been read by a remote thread, a "downgrade" request is sent from the reader to the recent writer. DG bit 506 is set (e.g., to a value of "1") in response to such a "downgrade" request is sent, and DG bit 506 is cleared (unset, e.g. to a value of "0") after each local access. DG bit 506 is set or cleared as appropriate by the atomicity violation control logic, or alternatively the setting and clearing operations may be incorporated into the cache coherence protocol.

PI bit 508 provides P-instruction type information. PI bit 508 is set (e.g., to a value of "1") at each local read access to the cache line, and is cleared or unset (e.g., to a value of "0") at each local write access to the cache line. PI bit 508 is set or cleared as appropriate by the atomicity violation control logic, or alternatively the setting and clearing operations may be incorporated into the cache coherence protocol.

The hardware cache coherence protocol of the computing device is extended to support the DG and PI bits, optionally including setting and clearing the bits as appropriate as discussed above. Additionally, special instruction encodings are used for I-instructions (read accesses and write accesses). An additional bit is used in the cache access command to indicate when a memory instruction is an I-instruction. Typically, instructions are represented within a computing device as (encoded as) a sequence of bits. When I-instructions are identified during the extraction process discussed above, an additional bit is used in the instruction encodings of the AI invariants that are I-instructions to identify the instructions as I-instructions. This can be an additional bit added to the instruction encoding, or alternatively can be the use of an otherwise unused or spare bit in the instruction. This additional bit is set when appropriate by, for example, the atomicity violation control logic.

Using these extensions, the state of these bits in the cache lines can be maintained as follows. In response to an invalidate request for the cache line, the INV bit for the cache line is set. In response to a downgrade request for the cache line, the DG bit is set. In response to any other access to the cache line, the PI bit is updated based on the type of access, the DG bit is cleared, and the INV bit is cleared. When an L1 miss occurs from an I-instruction (that is, the cache line referred to by the I-instruction is not in the L1 cache), then a bug detection routine (e.g., as illustrated in FIG. 6) is followed.

Figure 6:
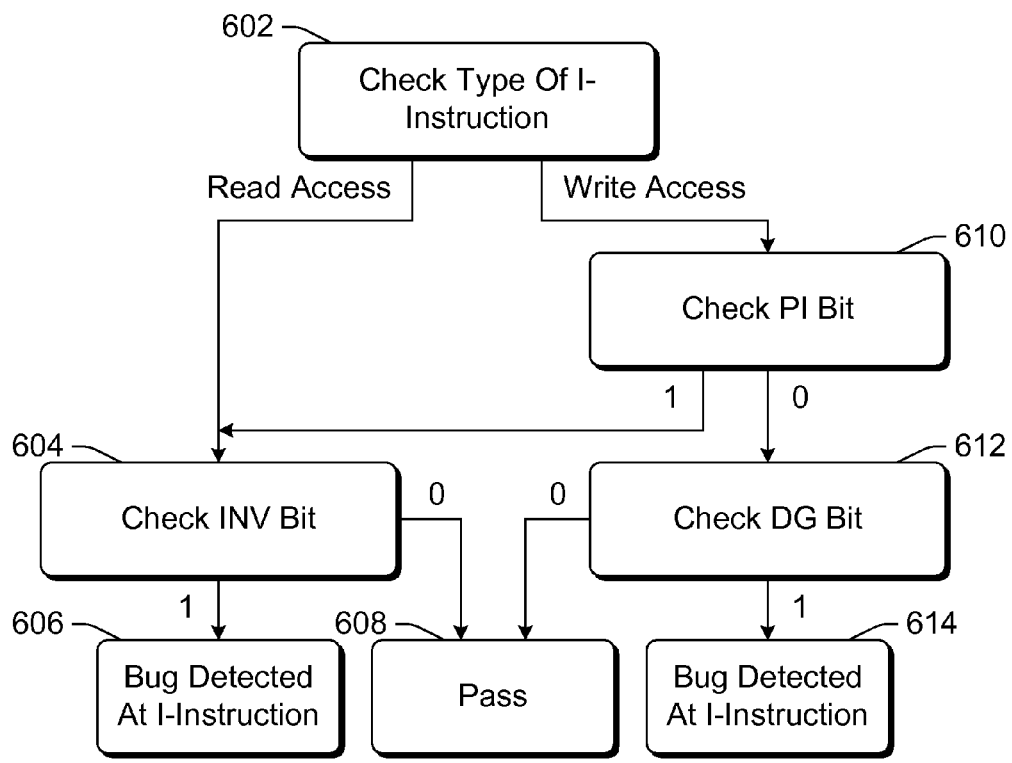
FIG. 6 illustrates an example bug detection routine.

FIG. 6 illustrates an example bug detection routine 600. Routine 600 is typically performed in firmware and/or hardware. In one or more embodiments, an unserializable interleaving only happens when the cache coherence protocol indicates that the local copy of the cache line cannot be used and needs to contact the L2 cache memory to get the most up-to-date copy and/or exclusive write permission for the cache line. Accordingly, routine 600 is performed when an I-instruction cannot be satisfied by the L1 cache in accordance with certain embodiments. Routine 600 uses the extensions discussed above as part of a test to determine whether a bug (an atomicity violation) is present at the I-instruction.

Routine 600 begins by checking the type of instruction (act 602). If the instruction type is a read access, then the INV bit of the cache line accessed by the instruction is checked (act 604). If the INV bit of the cache line is set (e.g., has a value of "1"), then a bug is detected at the I-instruction (act 606). However, if the INV bit of the cache line is cleared (e.g., has a value of "0"), then the I-instruction passes the bug detection test (act 608).

Returning to act 602, if the instruction type is a write access, then the PI bit of the cache line accessed by the instruction is checked (act 610). If the PI bit is set (e.g., has a value of "1"), then the INV bit of the cache line accessed by the instruction is checked (act 604). If the INV bit of the cache line is set (e.g., has a value of "1"), then a bug is detected at the I-instruction (act 606). However, if the INV bit of the cache line is cleared (e.g., has a value of "0"), then the I-instruction passes the bug detection test (act 608).

Returning to act 610, if the PI bit is cleared (e.g., has a value of "0"), then the DG bit of the cache line accessed by the instruction is checked (act 612). If the DG bit is set (e.g., has a value of "1"), then a bug is detected at the I-instruction (act 614). However, if the DG bit of the cache line is cleared (e.g., has a value of "0"), then the I-instruction passes the bug detection test (act 608).

In processor architectures employing out of order execution of instructions, after detecting an AI invariant violation (in act 608 or act 614), the I-instruction is marked in the reorder buffer and a signal is sent to indicate that a bug has been identified when the I-instruction retires. Accordingly, no bug is reported for speculative instructions.

Bugs can be reported in acts 608 and 614 in a variety of different manners. For example, a break in the execution of the program could be performed, causing an exception to occur and notification of the bug to immediately be made. By way of another example, a record of the I-instruction (e.g., the I-instruction's program counter (PC) and accessed address) could be recorded for subsequent access.

Additionally, the cache lines can be extended to include a tag with the thread identifiers that are accessing the cache lines in order to reduce conflicts resulting from context switches. When a cache line is accessed by a thread, the tag is updated to reflect the thread identifier that accessed the cache line. When a context switch occurs (a switch from executing one thread to another), the hardware is typically not aware of the switch. By maintaining the thread identifiers in the cache lines, the hardware is able to identify which thread most recently accessed which cache lines. These thread identifiers can be used to assist in determining whether accesses are remote accesses or local accesses.

The extensions to the cache lines and cache coherence protocols discussed above are based on performing the atomicity violation detection on a chip-level multiprocessing (CMP) or symmetric multiprocessing (SMP) processor architecture. Other architectures, such as simultaneous multithreading (SMT) processor architectures can also be supported. In one or more embodiments, to support SMT processor architectures the cache lines are extended to include tags with identifiers of the threads being executed and accessing the cache lines. When a cache line is accessed by a thread, the tag for that cache line is updated to reflect the thread identifier that accessed the cache line.

In addition, the extensions discussed above refer to using single bits (e.g., the INV bit, the DG bit, and PI bit) to indicate certain conditions. Alternatively, these conditions may be indicated using multiple bits (e.g., the information maintained by the PI bit may be indicated using two or more bits).

It should also be noted that situations can arise where instructions that are in a load-store queue of the processor are not visible for the atomicity violation detection because they are in the queue rather than in the L1 cache. Such situations typically rarely adversely affect the atomicity violation detection techniques discussed herein and can thus be ignored. Alternatively such issues can be addressed in different manners, such as by forcing global memory access to go through the lower memory hierarchy of the computing device.

Additionally, the discussions of implementing the atomicity violation detection using hardware include discussions of maintaining and analyzing information on a cache line basis. Alternatively, a smaller granularity may be used, such as maintaining and analyzing information on a word basis. The information that is maintained is analogous to that discussed above with respect to cache lines, but the information is maintained for each word rather than for each cache line as a whole.

It should be noted that the discussions of FIGS. 5 and 6 above describe a hardware implementation based on a snoopy invalidation-based cache coherence protocol. It is to be appreciated, however, that different hardware implementations can be based on different cache coherence protocols, and that the atomicity violation detection using access interleaving invariants discussed herein can be performed using any cache coherence protocol. For example, a different hardware implementation could be based on a directory-based cache coherence protocol.

As discussed above, the atomicity violation detection using access interleaving invariants can be performed in software, firmware, hardware, or combinations thereof. An example of a software (or firmware) implementation in accordance with one or more embodiments is illustrated with reference to FIG. 7.

Figure 7:
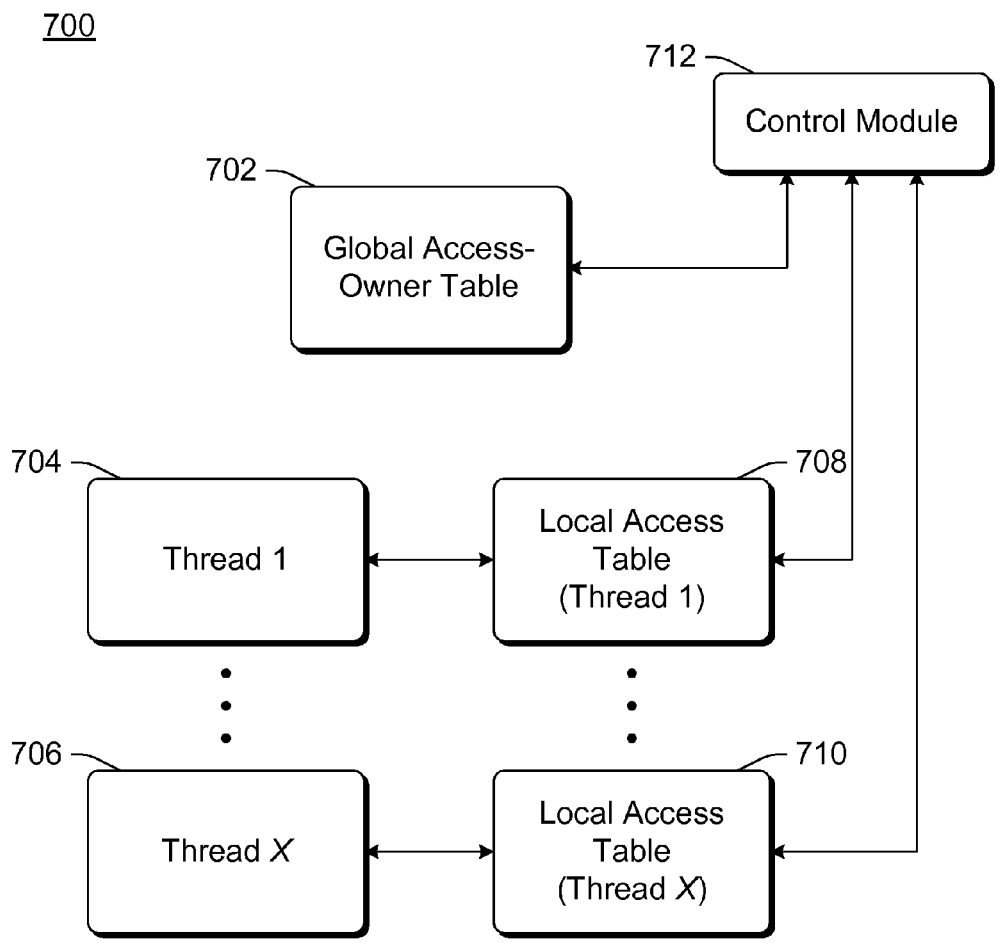
FIG. 7 illustrates an example system employing multiple tables to support the software implementation of the atomicity violation detection using access interleaving invariants.

To support the software implementation of the atomicity violation detection using access interleaving invariants, multiple access tables are employed. FIG. 7 illustrates an example system 700 employing such tables. System 700 includes a global access-owner table 702, multiple (X) threads 704, . . . , 706, multiple (X) local access tables 708, . . . , 710, and a control module 712. In system 700, various access information is collected by control module 712 at every global memory access and is maintained in tables 702 and 708, . . . , 710.

Global access-owner table 702 stores the identifier of the thread that most recently wrote to each global memory location. Each thread 704, . . . , 706 has a corresponding local access table 708, . . . , 710, and each local access table 708, . . . , 710 stores the access type information (e.g., read access or write access) of its latest access to each global memory location. In one or more implementations, each local access table 708, . . . , 710 stores, for each global memory location, whether the last access by the corresponding thread was a read access, a write access, or that there was no previous access. Furthermore, each local access table 708, . . . , 710 includes information (e.g., a bit) that indicates, for each global memory location, whether there has been a write to that memory location by another thread since the corresponding thread last accessed (a read access or a write access) that memory location.

Additionally, information identifying whether each memory location is shared or private is also maintained by the tables of FIG. 7. This information can be maintained in table 702 and/or tables 708, . . . , 710.

These tables can be used to implement the atomicity violation detection using access interleaving invariants as follows. At each memory access from an I-instruction, the P-instruction type can be obtained from the local access table of the thread executing the I-instruction. The information regarding remote read and write accesses can be inferred by comparing the local thread identifier with the identifier of the thread that most recently wrote to that global memory location. For example, if the thread that most recently wrote to the global memory location that is being accessed by the I-instruction (as identified by global access-owner table 702) is different than the thread executing the I-instruction, then a remote write access to that global memory location occurred.

It should be noted that the discussions of FIG. 7 above describes a software implementation that resembles a directory-based cache coherence protocol. It is to be appreciated, however, that alternatively different software implementations can be employed. It is also to be appreciated that the atomicity violation detection using access interleaving invariants discussed herein can be performed using different hardware and different cache coherence protocols (e.g., directory-based or snoopy invalidation-based cache coherence protocols).

Figure 8:
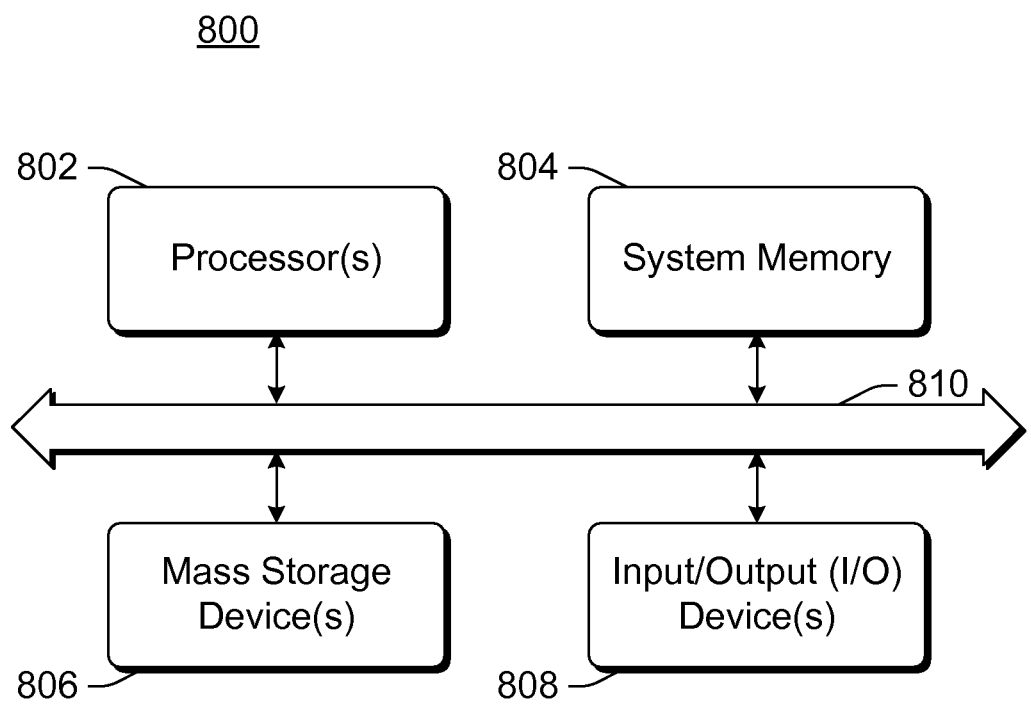
FIG. 8 is a block diagram illustrating an example computing device that can be used to implement the various techniques and processes discussed herein.

FIG. 8 is a block diagram illustrating an example computing device 800. Computing device 800 can be used to implement the various techniques and processes discussed herein. For example, computing device 800 may implement extraction module 102 and/or detection module 104 of FIG. 1. By way of another example, any of the processes discussed herein can be implemented by a processor(s) of computing device 800 executing instructions stored on one or more computer readable media. Computing device 800 can be any of a wide variety of computing devices, such as a desktop computer, a server computer, a handheld computer, a notebook computer, a personal digital assistant (PDA), an internet appliance, a game console, a set-top box, a cellular phone, a digital camera, audio and/or video players, audio and/or video recorders, and so forth.

Computing device 800 includes one or more processor(s) 802, system memory 804, mass storage device(s) 806, input/output (I/O) device(s) 808, and bus 810. Processor(s) 802 include one or more processors or controllers that execute instructions stored in system memory 804 and/or mass storage device(s) 806. Processor(s) 802 may also include computer readable media, such as cache memory.

System memory 804 includes various computer readable media, including volatile memory (such as random access memory (RAM)) and/or nonvolatile memory (such as read only memory (ROM)). System memory 804 may include rewritable ROM, such as Flash memory. System memory 804 includes removable and/or nonremovable media.

Mass storage device(s) 806 include various computer readable media, such as magnetic disks, optical disks, solid state memory (e.g., flash memory), and so forth. Various drives may also be included in mass storage device(s) 806 to enable reading from and/or writing to the various computer readable media. Mass storage device(s) 806 include removable media and/or nonremovable media.

I/O device(s) 808 include various devices that allow data and/or other information to be input to and/or output from computing device 800. Examples of I/O device(s) 808 include cursor control devices, keypads, microphones, monitors or other displays, speakers, printers, network interface cards, modems, lenses, CCDs or other image capture devices, and so forth.

Bus 810 allows processor(s) 802, system 804, mass storage device(s) 806, and I/O device(s) 808 to communicate with one another. Bus 810 can be one or more of multiple types of buses, such as a system bus, PCI bus, IEEE 1394 bus, USB bus, and so forth.

Although the description above uses language that is specific to structural features and/or methodological acts, it is to be understood that the subject matter defined in the appended claims is not limited to the specific features or acts described. Rather, the specific features and acts are disclosed as example forms of implementing the claims.

What is claimed is:

1. A method of detecting atomicity violations in a program, the method comprising:
   identifying, based on multiple executions of the program, multiple pairs of instructions that were intended to be executed atomically, the identifying multiple pairs of the instructions including a particular pair of instructions as one of the multiple pairs of instructions that were intended to be executed atomically only if atomicity of the particular pair of instructions is not violated during one of the multiple correct executions of the program;
   identifying, during subsequent execution of the program, when a pair of instructions of the multiple pairs of instructions are to be executed and the atomicity of the pair of instructions violated, wherein identifying the atomicity of the pair of instructions is violated comprises:
   accessing a cache line in a cache memory of a computing device that stores data for a memory location accessed by the pair of instructions, the cache line including:
   an invalidate bit that is set when an interleaving remote write to the memory location occurs,
   a downgrade bit that is set when the value in the memory location is a result of a previous write access by a local thread and the memory location has been read by a remote thread, and is cleared when the local thread accesses the memory location, and
   a preceding access instruction bit that is set when the local thread performs a read access to the memory location, and is cleared when the local thread performs a write access to the memory location, and
   using one or more of the invalidate bit, the downgrade bit, and the preceding access instruction bit to determine whether the atomicity of the pair of instructions is violated; and
   detecting a bug as occurring in the program at the pair of instructions.

2. A method as recited in claim 1, wherein identifying when a pair of the multiple pairs of instructions are to be executed and the atomicity of the pair of instructions violated comprises:
   checking whether one instruction of the pair of instructions in the program is a read access instruction type or a write access instruction type;
   if the one instruction is the read access instruction type, then detecting that the atomicity of the pair of instructions is violated based on whether there are any interleaving remote write accesses to a same location as accessed by the pair of instructions between the one instruction and a previous instruction of the pair of instructions; and
   if the one instruction is the write access instruction type, then detecting that the atomicity of the pair of instructions is violated based on whether the previous instruction of the pair of instructions is the read access instruction type or the write access instruction type.

3. A method as recited in claim 1, wherein identifying multiple pairs of instructions that were intended to be executed atomically comprises:
   identifying, from the multiple executions of the program, a set of access interleaving invariants that are not violated during the multiple executions of the program; and
   using the identified access interleaving invariants as a set of automatically extracted access interleaving invariants for the program.

4. A method as recited in claim 1, wherein identifying the atomicity of the pair of instructions is violated comprises: maintaining a global access-owner table that stores an identifier of a thread that most recently wrote to each global memory location; maintaining, for each thread of the program, a local access table that stores information identifying whether a latest access by the thread to each global memory location was a read access or a write access; and using the global access-owner table and the local access tables to determine whether the atomicity of the pair of instructions is violated.

5. A method as recited in claim 1, wherein using one or more of the invalidate bit, the downgrade bit, and the preceding access instruction bit to determine whether the atomicity of the pair of instructions is violated comprises:
   if one instruction of the pair of instructions is a read access instruction type and the invalidate bit is set, then determine that the atomicity of the pair of instructions is violated;
   if the one instruction of the pair of instructions is the read access instruction type and the invalidate bit is cleared, then determine that the atomicity of the pair of instructions is not violated;
   if the one instruction of the pair of instructions is a write access instruction type and the preceding access instruction bit is set and the invalidate bit is set, then determine that the atomicity of the pair of instructions is violated;
   if the one instruction of the pair of instructions is the write access instruction type and the preceding access instruction bit is set and the invalidate bit is cleared, then determine that the atomicity of the pair of instructions is not violated;
   if the one instruction of the pair of instructions is the write access instruction type and the preceding access instruction bit is cleared and the downgrade bit is set, then determine that the atomicity of the pair of instructions is violated; and
   if the one instruction of the pair of instructions is the write access instruction type and the preceding access instruction bit is cleared and the downgrade bit is cleared, then determine that the atomicity of the pair of instructions is not violated.

6. One or more non-transitory computer readable media having stored thereon instructions that detect atomicity violations in a program and that, when executed by one or more processors of a computing device, cause the one or more processors to:
   check whether one instruction of a pair of instructions in the program is a read access instruction type or a write access instruction type, the pair of instructions comprising one of a set of access interleaving invariants having been generated by identifying multiple access interleaving invariants and including in the set of access interleaving invariants only ones of the multiple access interleaving invariants that are not violated during one of multiple correct executions of the program;

maintain a global access-owner table that stores an identifier of a thread that most recently wrote to each global memory location;

maintain, for each thread of the program, a local access table that stores information identifying whether a latest access by the thread to each global memory location was a read access or a write access;

use the global access-owner table and the local access tables to determine whether there are any interleaving remote write accesses to the same location as accessed by the pair of instructions between the one instruction and a previous instruction of the pair of instructions;

if the one instruction is the read access instruction type, then detect an atomicity violation at the pair of instructions based on whether there are any interleaving remote write accesses to the same location as accessed by the pair of instructions between the one instruction and the previous instruction of the pair of instructions; and if the one instruction is the write access instruction type, then detect an atomicity violation at the pair of instructions based on whether the previous instruction of the pair of instructions is the read access instruction type or the write access instruction type.

7. The one or more computer readable media as recited in claim 6, wherein to check whether the one instruction is a read access instruction type or a write access instruction type is to check whether the one instruction is a read access instruction type or a write access instruction type only if the one instruction is an I-instruction of an access interleaving invariant.

8. The one or more computer readable media as recited in claim 6, wherein to detect an atomicity violation at the pair of instructions based on whether there are any interleaving remote write accesses between the one instruction and the previous instruction of the pair of instructions is to:

check whether there are any interleaving remote write accesses between the one instruction and the previous instruction of the pair of instructions;

if there are not any interleaving remote write accesses between the one instruction and the previous instruction of the pair of instructions then detect that no atomicity violation occurs at the pair of instructions; and if there is at least one interleaving remote write access between the one instruction and the previous instruction of the pair of instructions then detect that an atomicity violation occurs at the pair of instructions.

9. The one or more computer readable media as recited in claim 6, wherein to detect an atomicity violation at the pair of instructions based on whether the previous instruction of the pair of instructions is the read access instruction type or the write access instruction type is to:

check whether the previous instruction is the read access instruction type or the write access instruction type;

if the previous instruction is the read access instruction type, then:

check whether there are any interleaving remote write accesses between the one instruction and the previous instruction of the pair of instructions;

if there are not any interleaving remote write accesses between the one instruction and the previous instruction of the pair of instructions then detect that no atomicity violation occurs at the pair of instructions; and if there is at least one interleaving remote write access between the one instruction and the previous instruction of the pair of instructions then detect that an atomicity violation occurs at the pair of instructions; and if the previous instruction is the write access instruction type, then:

check whether any interleaving remote read access gets a result of the previous instruction;

if no interleaving remote read access gets the result of the previous instruction, then detect that no atomicity violation occurs at the pair of instructions; and if there is at least one interleaving remote read access that gets the result of the previous instruction, then detect that an atomicity violation occurs at the pair of instructions.

10. One or more non-transitory computer readable media having stored thereon instructions that automatically extract access interleaving invariants in a program and that, when executed by one or more processors of a computing device, cause the one or more processors to:

identify, from multiple correct executions of the program, a set of access interleaving invariants that are not violated during the multiple correct executions of the program, wherein an access interleaving invariant is to be included in the set of access interleaving invariants only if the access interleaving invariant is not violated during one of the multiple correct executions of the program, and wherein to identify the set of access interleaving invariants is to:

create a current set of possible access interleaving invariants in the program, for each execution of the program, detect whether any access interleaving invariants are violated at least a first threshold number of times and remove any access interleaving invariants that are violated at least the first threshold number of times from the current set, repeat execution of the program until the program is executed at least a second threshold number of times without any changes to the current set of possible access interleaving invariants, and remove, after the program is executed at least the second threshold number of times without any changes to the current set of possible access interleaving invariants, any access interleaving invariants including instructions that were never executed during the execution of the program; and use the identified access interleaving invariants as a set of automatically extracted access interleaving invariants for the program.

11. The one or more computer readable media as recited in claim 10, wherein the first threshold number of times comprises one time.

12. The one or more non-transitory computer readable media as recited in claim 10, wherein to identify the set of access interleaving invariants that are not violated during the multiple executions of the program is to:

check whether one instruction of a pair of instructions in the program is a read access instruction type or a write access instruction type;

if the one instruction is the read access instruction type, then determine whether an access interleaving invariant including the one instruction is violated based on whether there are any interleaving remote write accesses to a same location as accessed by the pair of instructions between the one instruction and a previous instruction of the pair of instructions; and if the one instruction is the write access instruction type, then determine whether an access interleaving invariant including the one instruction is violated based on whether the previous instruction of the pair of instructions is the read access instruction type or the write access instruction type.

13. A computing device comprising:
a processor;
a cache memory storing data organized by cache line, each cache line having associated with it a downgrade bit and a preceding access instruction bit, and wherein for each cache line:
the downgrade bit of the cache line is set when data in the cache line is a result of a previous write access by a local thread and the cache line has been read by a remote thread,
the downgrade bit of the cache line is cleared when the local thread accesses the cache line,
the preceding access instruction bit of the cache line is set when the local thread performs a read access to the cache line, and
the preceding access instruction bit of the cache line is cleared when the local thread performs a write access to the memory location;
the each cache line being associated with a thread identifier to identify which of a plurality of threads of a program being executed by the processor most recently accessed the cache line; and
a set of instructions to use the downgrade bit, the preceding access instruction bit, and the thread identifier to detect atomicity violations in the program being executed by the processor.

14. A computing device as recited in claim 13, wherein the set of instructions use the downgrade bit and the preceding access bit to detect atomicity violations as follows:
if one instruction of a pair of instructions in the program is a read access instruction type and an invalidate bit of the cache line accessed by the one instruction is set, then determine that the atomicity of the pair of instructions is violated;
if the one instruction of the pair of instructions is the read access instruction type and the invalidate bit is cleared, then determine that the atomicity of the pair of instructions is not violated;
if the one instruction of the pair of instructions is a write access instruction type and the preceding access instruction bit is set and the invalidate bit is set, then determine that the atomicity of the pair of instructions is violated;
if the one instruction of the pair of instructions is the write access instruction type and the preceding access instruction bit is set and the invalidate bit is cleared, then determine that the atomicity of the pair of instructions is not violated;
if the one instruction of the pair of instructions is the write access instruction type and the preceding access instruction bit is cleared and the downgrade bit is set, then determine that the atomicity of the pair of instructions is violated; and
if the one instruction of the pair of instructions is the write access instruction type and the preceding access instruction bit is cleared and the downgrade bit is cleared, then determine that the atomicity of the pair of instructions is not violated.

15. A computing device as recited in claim 14, wherein the one instruction of the pair of instructions in the program is encoded to identify the one instruction as an I-instruction, and to indicate that a check as to whether there is an atomicity violation at the pair of instructions is to be performed.

16. A computing device as recited in claim 13, each cache line having associated with it multiple downgrade bits and multiple preceding access instruction bits, each of the multiple downgrade bits being associated with one of multiple words in the cache line, and each of the multiple preceding access instruction bits being associated with one of the multiple words in the cache line.

* * * * *